(12) United States Patent
Uto et al.

(10) Patent No.: US 10,241,549 B2
(45) Date of Patent: Mar. 26, 2019

(54) ELECTRONIC APPARATUS

(71) Applicant: KYOCERA Corporation, Kyoto-shi, Kyoto (JP)

(72) Inventors: Takashi Uto, Higashiomi (JP); Satoru Tsubokura, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/107,988

(22) PCT Filed: Dec. 25, 2014

(86) PCT No.: PCT/JP2014/084428
§ 371 (c)(1),
(2) Date: Jun. 24, 2016

(87) PCT Pub. No.: WO2015/099096
PCT Pub. Date: Jul. 2, 2015

(65) Prior Publication Data
US 2016/0334843 A1 Nov. 17, 2016

(30) Foreign Application Priority Data
Dec. 25, 2013 (JP) .................. 2013-267017

(51) Int. Cl.
*G06F 1/20* (2006.01)
*G06F 3/044* (2006.01)
(Continued)

(52) U.S. Cl.
CPC ........ *G06F 1/203* (2013.01); *G02F 1/133308* (2013.01); *G02F 1/133385* (2013.01);
(Continued)

(58) Field of Classification Search
CPC ........ G06F 1/203; G06F 3/0412; G06F 3/044; G06F 1/1605; G06F 1/1656;
(Continued)

(56) References Cited

U.S. PATENT DOCUMENTS 6,414,781 B1 7/2002 Saitoh
9,052,785 B2 * 6/2015 Horie .................. G06F 3/03545
(Continued)

FOREIGN PATENT DOCUMENTS

JP 2011-61316 A 3/2011
JP 2011-150226 A 8/2011
(Continued)

OTHER PUBLICATIONS

JP2013-141148, Kyocera Corp, Horii Shoji, Electronic Device, Jul. 18, 2013, JPO translation date Jan. 10, 2017.*
(Continued)

*Primary Examiner* — James Wu
*Assistant Examiner* — Michael A Matey
(74) *Attorney, Agent, or Firm* — Procopio Cory Hargreaves and Savitch LLP

(57) ABSTRACT

An electronic apparatus is provided. The electronic apparatus includes a case body including a single crystal body in at least a portion thereof, the single crystal body containing alumina ($Al_2O_3$) as a main component; a plurality of information processing devices in the case body; and a thermally conductive portion that thermally connects at least one of the information processing devices to the single crystal body.

10 Claims, 12 Drawing Sheets

(51) Int. Cl.
*G06F 3/041* (2006.01)
*G02F 1/1333* (2006.01)
*G02F 1/1335* (2006.01)

(52) U.S. Cl.
CPC ............ *G06F 3/044* (2013.01); *G06F 3/0412* (2013.01); *G02F 1/13338* (2013.01); *G02F 1/133512* (2013.01); *G02F 2001/133331* (2013.01); *G02F 2202/28* (2013.01)

(58) Field of Classification Search
CPC ............ G06F 1/1626; G02F 1/133308; G02F 1/13338; G02F 1/133385; G02F 1/133512; G02F 2001/133331; G02F 2202/28; H04R 17/00; H04R 2460/13; H04M 1/0266; H04M 1/03; H05K 1/181; H05K 5/0017; F21V 15/01; F21V 33/00
See application file for complete search history.

(56) References Cited

U.S. PATENT DOCUMENTS

| | | | | |
|---|---|---|---|---|
| 9,151,978 | B2* | 10/2015 | Tsurusaki | G06F 3/041 |
| 2002/0131141 | A1* | 9/2002 | Saitoh | G02F 1/133308 359/245 |
| 2004/0114318 | A1* | 6/2004 | Nuovo | H04M 1/026 361/679.3 |
| 2005/0047067 | A1* | 3/2005 | Bang | H05K 7/20963 361/679.21 |
| 2007/0153458 | A1* | 7/2007 | Okimoto | G06F 1/1601 361/679.22 |
| 2008/0246741 | A1* | 10/2008 | Hinata | G06F 3/045 345/173 |
| 2009/0135115 | A1* | 5/2009 | Sakamoto | G02F 1/1336 345/84 |
| 2010/0014034 | A1 | 1/2010 | Matsuhira | |
| 2010/0020497 | A1* | 1/2010 | Hayakawa | H05K 3/284 361/705 |
| 2010/0053854 | A1* | 3/2010 | Nishikawa | G06F 1/1626 361/679.01 |
| 2011/0053653 | A1* | 3/2011 | Tho | H04M 1/0202 455/566 |
| 2011/0181937 | A1* | 7/2011 | Miyashita | G02F 1/133308 359/263 |
| 2011/0188180 | A1* | 8/2011 | Pakula | G06F 1/1626 361/679.01 |
| 2012/0212890 | A1* | 8/2012 | Hoshino | H04M 1/0202 361/679.01 |
| 2013/0077058 | A1* | 3/2013 | Miyashita | H04N 9/3105 353/52 |
| 2013/0208450 | A1 | 8/2013 | Imaoku et al. | |
| 2013/0236699 | A1* | 9/2013 | Prest | B32B 9/002 428/157 |
| 2013/0321321 | A1* | 12/2013 | Hiraoka | G06F 3/016 345/173 |
| 2013/0328820 | A1* | 12/2013 | Kondoh | G06F 1/1656 345/173 |
| 2014/0139978 | A1* | 5/2014 | Kwong | H04M 1/0202 361/679.01 |
| 2015/0005035 | A1* | 1/2015 | Horii | H04M 1/03 455/566 |
| 2015/0146397 | A1* | 5/2015 | Fujihara | H01L 33/62 361/767 |
| 2015/0168767 | A1* | 6/2015 | Yonemura | G02F 1/133308 349/58 |
| 2015/0253612 | A1* | 9/2015 | Hasegawa | G02F 1/133308 349/58 |
| 2015/0326967 | A1* | 11/2015 | Otani | H04R 1/028 381/114 |

FOREIGN PATENT DOCUMENTS

| | | |
|---|---|---|
| JP | 2013-131987 A | 7/2013 |
| JP | 2013-141213 A | 7/2013 |
| WO | 2008/093704 A | 8/2008 |
| WO | 2012/050290 A1 | 4/2012 |

OTHER PUBLICATIONS

JP2013-131987, Kyocera Corp, Otani Masayuki, Electronic apparatus, Jul. 4, 2013, JPO translation date Jan. 10, 2017.*
International Search Report (Form PCT/ISA/210) dated Mar. 17, 2015 and issued for PCT/JP2014/084428.

* cited by examiner

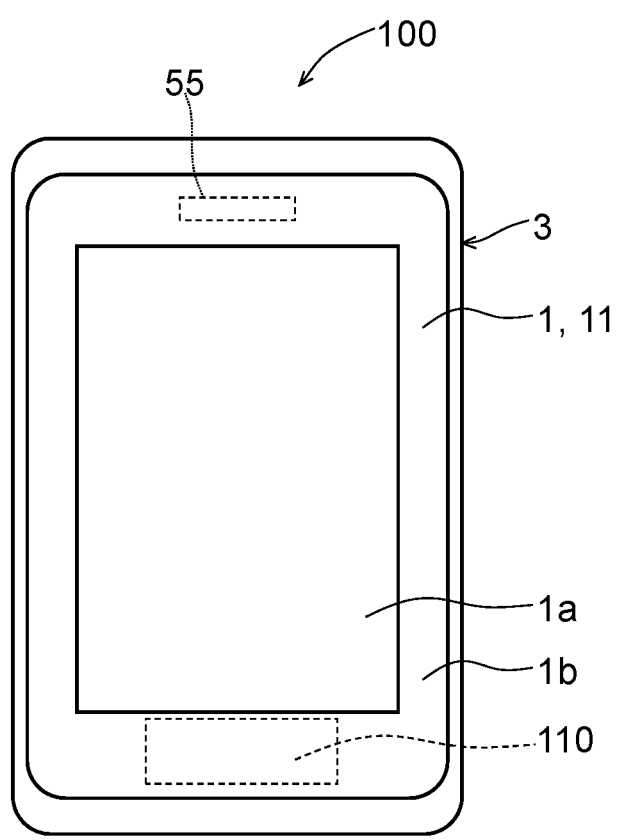

ELECTRONIC APPARATUS

TECHNICAL FIELD

The present invention relates to an electronic apparatus.

BACKGROUND ART

Electronic apparatuses, such as digital cameras and mobile phones, in which image display devices, such as liquid crystal panels and organic EL panels, are mounted have been used. In recent years, portable electronic apparatuses, such as smart phone terminals and tablet terminals, which display relatively large images and include input devices, such as touch panels, have rapidly come into widespread use. PTL 1, for example, discloses a technology related to such a smart phone. In a portable electronic apparatus, a light-transmissive cover plate for protecting an image display surface of an image display device, such as a liquid crystal panel or an organic EL panel, is disposed on a portion of a housing of the electronic apparatus. The light-transmissive cover plate is composed mainly of strengthened glass made of, for example, aminosilicate glass. In smart phone terminals and tablet terminals, with the increase in the resolution of displayed images, communication speed, and software functionality, the amount of information processed by information processing devices, such as a central processing unit (CPU), has increased. Accordingly, there is a need to reduce the information processing time, that is, to increase the information processing speed.

CITATION LIST

Patent Literature

PTL 1: Japanese Unexamined Patent Application Publication No. 2011-61316

SUMMARY OF INVENTION

Technical Problem

When a large amount of information is processed by information processing devices, such as a CPU, in a short time, the information processing devices generate a large amount of heat, and the temperature in the housing (apparatus case) of the electronic apparatus increases. In recent years, with the increase in the resolution of displayed images, communication speed, and software functionality, the amount of generated heat has increased. Therefore, the temperature in the apparatus case may be excessively increased while the electronic apparatus is being used, and this may lead to operation failures of devices in the apparatus case due to the temperature. The light-transmissive cover plate is generally a relatively large portion of the apparatus case. However, since the light-transmissive cover plate according to the related art, which is made of strengthened glass or the like, does not have a high thermal conductivity, the heat cannot be easily released from the light-transmissive cover plate, and the temperature in the apparatus case relatively easily increases. The light-transmissive cover plate made of, for example, strengthened glass also has a problem that the mechanical strength thereof is not sufficient, and the light-transmissive cover plate is easily broken due to, for example, impact applied thereto when the electronic apparatus is dropped.

Solution to Problem

To solve the above-described problems, an electronic apparatus is provided. The electronic apparatus includes a case body including a single crystal body in at least a portion thereof, the single crystal body containing alumina ($Al_2O_3$) as a main component; a plurality of information processing devices in the case body; and a thermally conductive portion that thermally connects at least one of the information processing devices to the single crystal body.

Advantageous Effects of Invention

The electronic apparatus has a high heat dissipation effect and is capable of efficiently releasing heat in the apparatus case to the outside. The electronic apparatus is not easily broken due to external impact applied thereto.

BRIEF DESCRIPTION OF DRAWINGS

FIG. 2 is a front view illustrating the external appearance of the electronic apparatus.

DESCRIPTION OF EMBODIMENTS

Embodiments will be described with reference to the drawings.

<External Appearance of Electronic Apparatus>

Figure 1A:
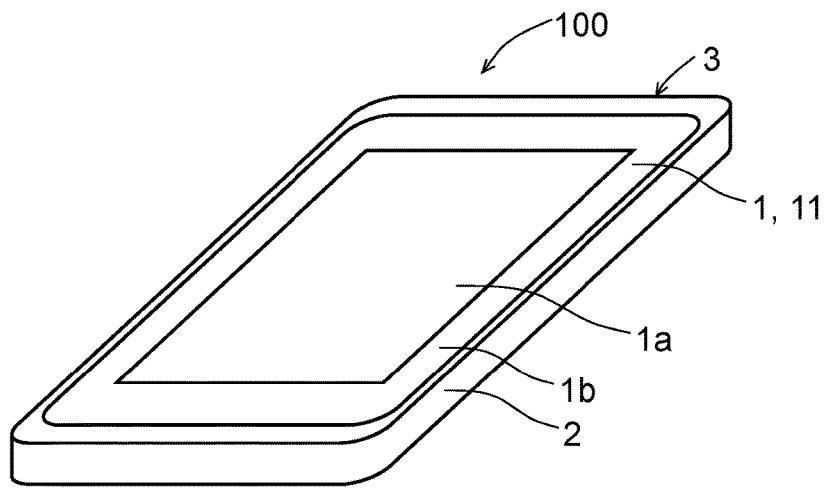
FIG. 1(a) is a perspective view illustrating the external appearance of an electronic apparatus.
Figure 1B:
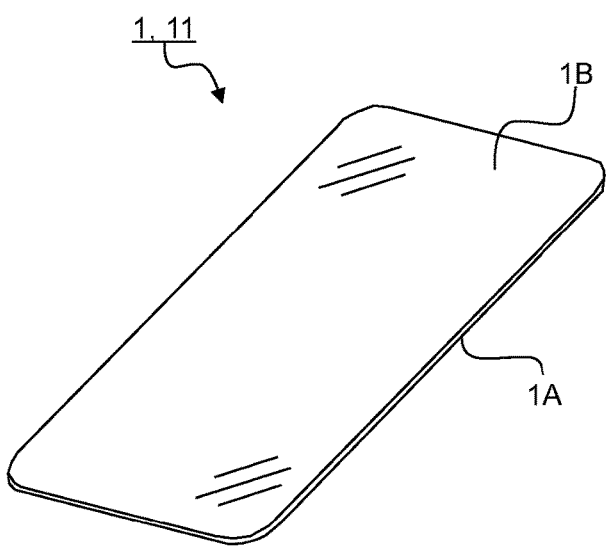
FIG. 1(b) is a schematic perspective view of a light-transmissive cover plate included in the electronic apparatus illustrated in FIG. 1(a).
Figure 3:
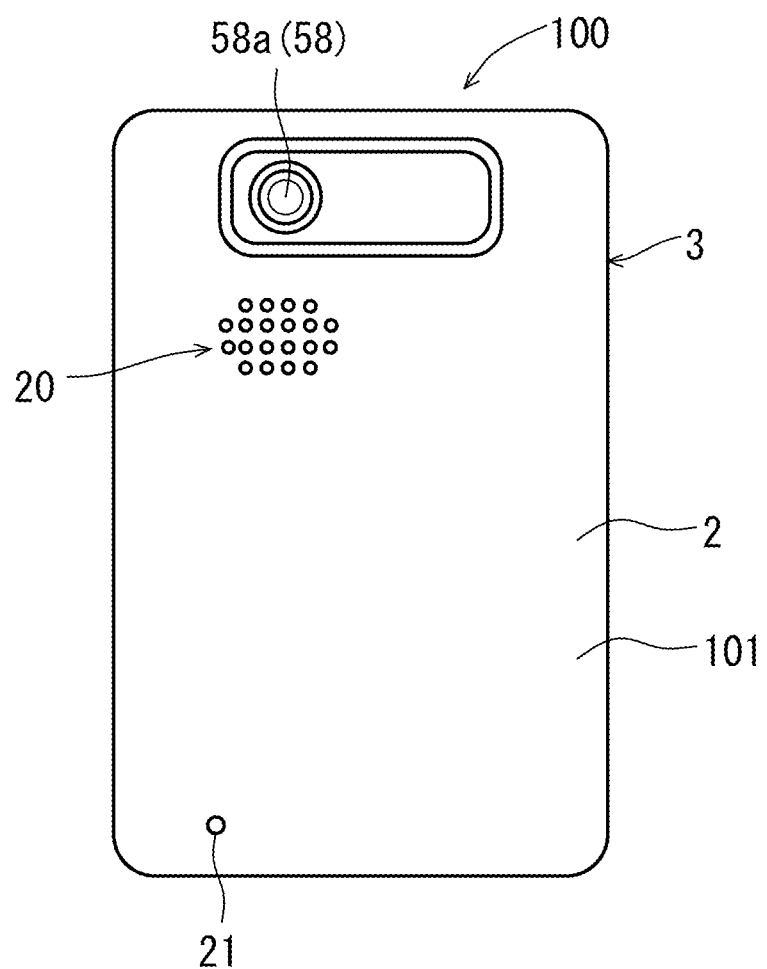
FIG. 3 is a rear view illustrating the external appearance of the electronic apparatus.
Figure 4:
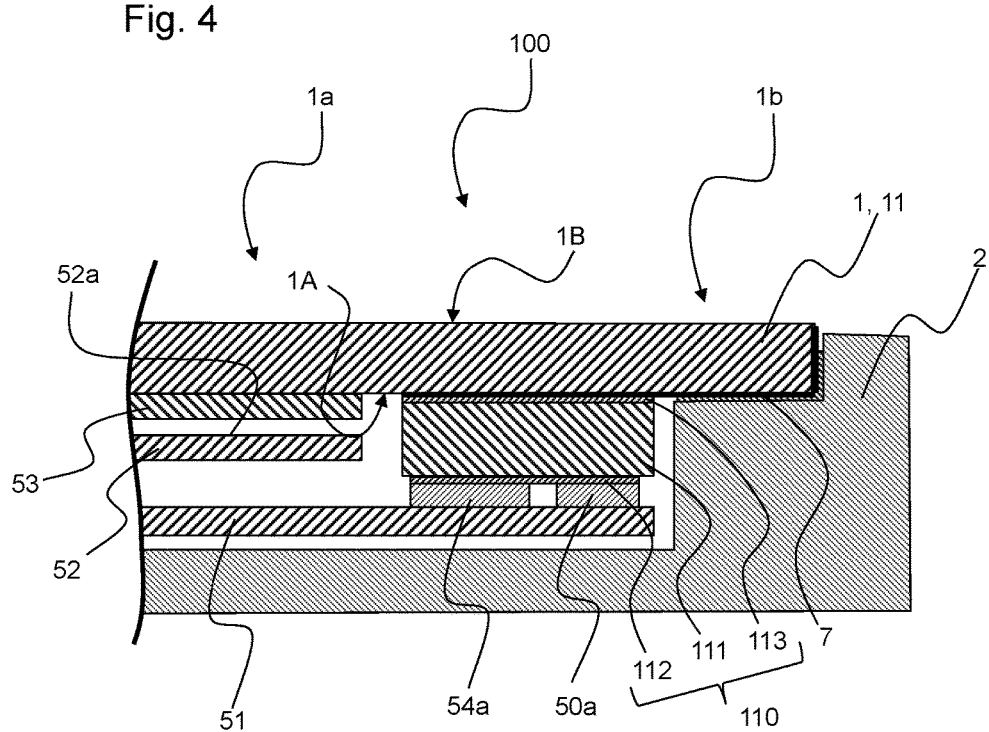
FIG. 4 is an enlarged cross-sectional view illustrating a portion of an embodiment of the electronic apparatus.

FIG. 1(a) is a perspective view illustrating an electronic apparatus 100, which is an embodiment of an electronic apparatus, and FIG. 1(b) is a perspective view of a light-transmissive cover plate 1, which is an embodiment of a light-transmissive cover plate included in the electronic apparatus illustrated in FIG. 1(a). FIG. 2 is a front view of the electronic apparatus 100, and FIG. 3 is a rear view of the electronic apparatus 100. The electronic apparatus 100 according to the present embodiment is, for example, a smart phone terminal or a tablet terminal. FIG. 4 is a cross-sectional view of the electronic apparatus 100.

The electronic apparatus 100 includes a case body 3 including a single crystal body in at least a portion thereof, the single crystal body containing alumina ($Al_2O_3$) as a main component; a plurality of information processing devices (CPU 50a and various drivers described below) in the case body 3; and a thermally conductive portion 110 that thermally connects at least one of the information processing devices to the single crystal body. More specifically, the electronic apparatus 100 includes an image display device 52 in the case body 3, the image display device 52 including an image display surface 52a. The case body 3 includes the light-transmissive cover plate 1 including a first principal surface 1A that faces the image display surface 52 and a second principal surface 1B that opposite to the first principal surface 1A. The light-transmissive cover plate 1 includes a plate-shaped single crystal body 11. At least one of the information processing devices is thermally connected to the light-transmissive cover plate 1 through the thermally conductive portion 110. The case body 3 is formed by combining the light-transmissive cover plate 1 and a casing 2 together.

In this specification, the term "main component" means that the mass percentage of the component is at least 50 mass % or more, more preferably, 70 mass % or more. A single crystal of alumina ($Al_2O_3$), which is generally called sapphire, is less easily damaged or broken compared to strengthened glass or the like, and has a high thermal conductivity and high heat dissipation effect. From the viewpoint of making it more difficult to cause damage and reliably suppressing breakage, chipping, etc., the purity (mass percentage) of $Al_2O_3$ in the light-transmissive cover plate 1 is preferably 99 mass % or more. Sapphire has a very high Young's modulus of about 380 to 240 GPa, and is not easily deformed. In this specification, the term "light-transmissive" means that the transmittance of visible light is 50% or more. The thickness of the light-transmissive cover plate 1 of the present embodiment is, for example, about 0.4 to 1.5 mm. In the following description, a single crystal containing alumina ($Al_2O_3$) as the main component may be referred to simply as sapphire.

The light-transmissive cover plate 1 includes a display portion 1a in which an image of the image display surface 52a is displayed and a peripheral edge portion 1b that surrounds the display portion 1a. The thermally conductive portion 110 is in contact with the peripheral edge portion 1b. The peripheral edge portion 1b is provided with a light shielding layer 7, which is disposed on a surface of the single crystal body 11 and blocks the image of the image display surface 52a. And a light shielding layer 7 which blocks the image of the image display surface 52a is provided on the single crystal body 11 in the peripheral edge portion 1b. The display portion 1a is a portion in which various types of information such as characters, symbols, and drawings are displayed. The display portion 1a has, for example, a rectangular shape in plan view. The peripheral edge portion 1b is black because the light shielding layer 7 composed of, for example, a film having a metal as the main component is attached thereto. Thus, the peripheral edge portion 1b serves as a non-display portion in which no information is displayed. A touch panel 53, which will be described below, is attached to the inner principal surface of the light-transmissive cover plate 1. A user can give various instructions to the electronic apparatus 100 by operating the display portion 1a on the second principal surface 1B of the light-transmissive cover plate 1 with, for example, his or her finger.

Figure 5:
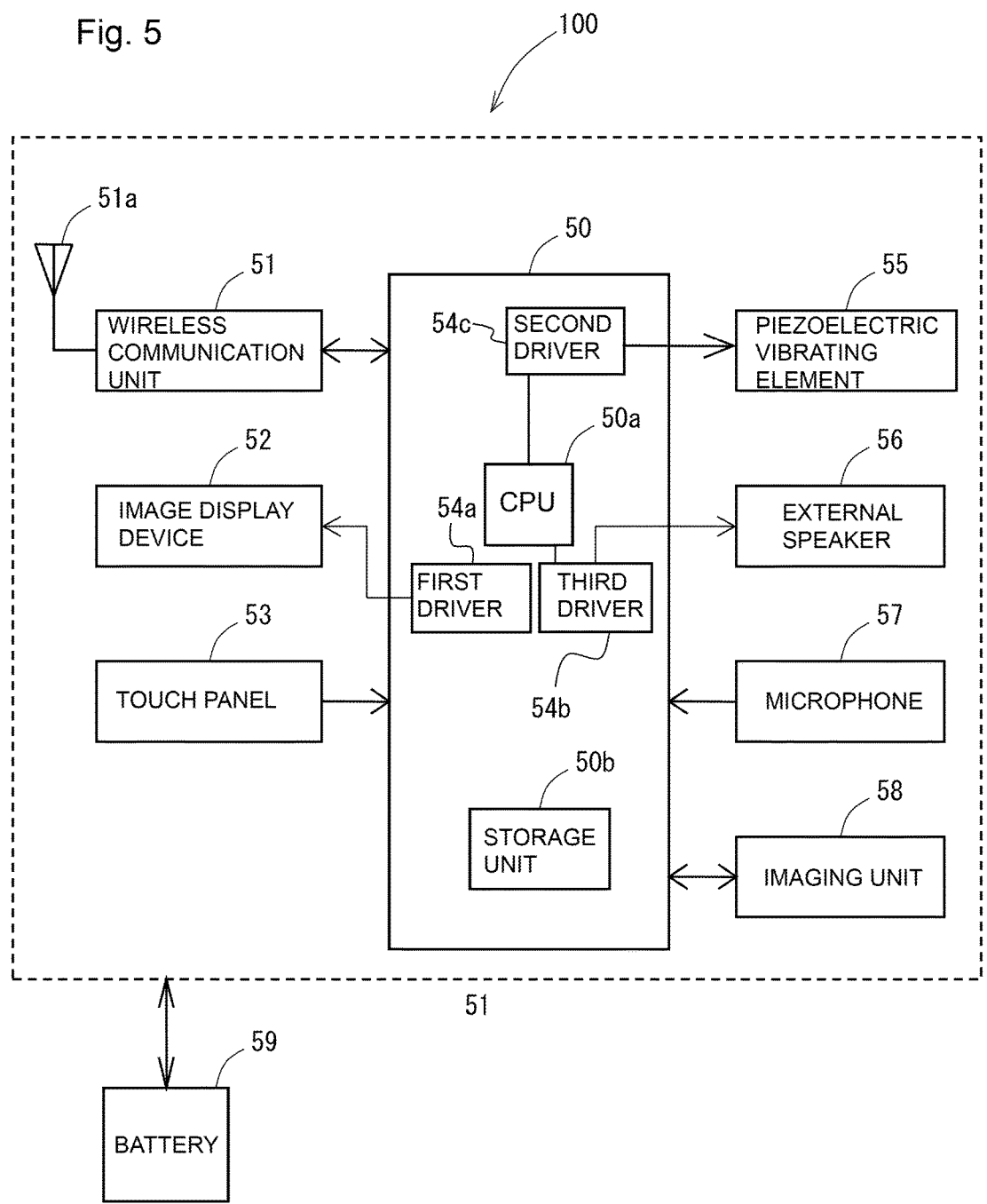
FIG. 5 is a block diagram illustrating the electric configuration of the electronic apparatus.

FIG. 5 is a block diagram illustrating an electric configuration of the electronic apparatus 100. As illustrated in FIG. 5, the electronic apparatus 100 includes a control unit 50, a wireless communication unit 51, the image display device 52, the touch panel 53, a piezoelectric vibrating element 55, an external speaker 56, a microphone 57, an imaging unit 58, and a battery 59, and these devices are accommodated in the apparatus case 3.

The control unit 50 includes the CPU 50a, which is one of the information processing devices; drivers (a first driver 54a, a second driver 54b, and a third driver 54c are illustrated in FIG. 5, and only the first driver 54a is illustrated in FIG. 4), which are also information processing devices; and a storage unit 50b. The control unit 50 manages the overall operation of the electronic apparatus 100 by receiving information from other components of the electronic apparatus 100, processing the received information, and transmitting the processed information to the other components. The storage unit 50b includes a ROM and a RAM. The CPU 50a of the control unit 50 forms various functional blocks by executing various programs stored in the storage unit 50b.

The CPU 50a receives a large amount of diverse information from other information processing devices, and performs processing (information processing) on the information in a relatively short time. The CPU 50a generates a relatively large amount of heat during the information processing. The drivers (the first driver 54a, the second driver 54b, and the third driver 54c), which are also information processing devices, are respectively connected to the image display device 52, the piezoelectric vibrating element 55, and the piezoelectric speaker 56, and operate the devices (the image display device 52, the piezoelectric vibrating element 55, and the piezoelectric speaker 56) on the basis of the information transmitted from the CPU 50a. Each driver also generates a relatively large amount of heat while operating the corresponding device. In particular, the CPU 50a and the first driver 54a process a large amount of information in a short time, and therefore generate a large amount of heat per unit time. Thus, a large amount of heat is generated by the CPU 50a and the first driver 54a.

In the present embodiment, as illustrated in FIG. 4, the CPU 50a and the drivers (only the first driver 54a is illustrated in FIG. 4) are mounted on, for example, a surface of the circuit board 51. The circuit board 51 may be, for example, a resin circuit board obtained by forming an insulating substrate by saturating a glass fiber cloth with epoxy resin and subjecting the cloth to a thermosetting process, and then forming a circuit composed of metal wires on the insulating substrate.

When heat generated by the information processing devices, such as the CPU 50a and the drivers (the first driver 54a, the second driver 54b, and the third driver 54c) remains in the apparatus case body 3, the temperature in the apparatus case body 3 increases. Accordingly, there is a risk that the operation speed of the CPU 50a will decrease or an operation failure of the CPU 50a will occur. Operation failures of other components may also occur in each section of the apparatus case body 3.

The electronic apparatus 100 of the present embodiment includes the case body 3 including sapphire in at least a portion thereof; the information processing devices (CPU 50a and various drivers described below) in the case body 3; and the thermally conductive portion 110 that thermally connects at least one of the information processing devices to the sapphire. Heat generated by the information processing devices is easily released from the sapphire portion (the light-transmissive cover plate 1 in the present embodiment) of the case body 3, which has a relatively high thermal conductivity, to the outside of the case body 3 through the thermally conductive portion 110. Thus, an increase in the temperature in the case body 3 is suppressed.

The thermally conductive portion 110 includes a high-thermal-conductivity body 111 (hereinafter referred to also as a first thermally conductive body 111) containing a single crystal of alumina ($Al_2O_3$) or a metal as the main component. In the present embodiment, the first thermally conductive body 111 is made of a single crystal containing alumina ($Al_2O_3$) as the main component (that is, sapphire). The thermally conductive portion 110 includes an adhesive layer 112 disposed between the first thermally conductive body 111 and the information processing devices (the CPU 50a and the drivers) and an adhesive layer 113 disposed between the first thermally conductive body 111 and the light-transmissive cover member 1 (more specifically, between the first thermally conductive body 111 and the light shielding layer 7).

The height of the first thermally conductive body 111 (height in the vertical direction in FIG. 4) is about 1 to 10 mm, and the height of the adhesive layers 112 and 113 (height in the vertical direction in FIG. 4) is about 0.01 mm to 0.1 mm. Thus, among the components of the thermally conductive portion 110, the first thermally conductive body 111 has a considerably high volume ratio. The adhesive layers 112 and 113 are made of, for example, a conductive adhesive, and the thermal conductivity thereof is about 1 to 20 W/(m·K). The thermal conductivity of the light shielding film 7 made of a metal is about several tens to several hundreds of watts per meter per kelvin (W/(m·K)). Although the thermally conductive portion 110 includes the adhesive layers 112 and 113, the thermal conductivity of the first thermally conductive body 111 made of sapphire, which occupies a significantly large space, is about 42 W/(m·K), and the thermal conductivity of the thermally conductive portion 110 as a whole is about 40 W/(m·K), which is relatively large. Since the thermally conductive portion 110 includes the high-thermal-conductivity body 111 (hereinafter referred to also as the first thermally conductive body 111) containing a single crystal of alumina ($Al_2O_3$) or a metal as the main component, the thermal conductivity of the thermally conductive portion 110 is relatively high. The thermally conductive portion 110 may be made of a high-viscosity material, such as grease, and the structure thereof is not particularly limited.

The thermal conductivity of the single crystal body 11 made of sapphire is about 42 W/(m·K) and is greater than that of, for example, quartz glass, which has a thermal conductivity of about 1 W/(m·K). In the electronic apparatus 100, heat generated by the CPU 50a and the first driver 54a is quickly transmitted to the single crystal body 11 of the light-transmissive cover plate 1 through the thermally conductive portion 110, which has a relatively high thermal conductivity, and is quickly distributed over the entirety of the single crystal body 11. The entirety of the second principal surface 1B, which is a surface of the single crystal body 11 included in the light-transmissive cover plate 1, is exposed to the outside air and serves as a heat dissipation surface. Accordingly, in the electronic apparatus 100, heat generated by the information processing devices (the CPU 50a and the drivers) can be efficiently released to the outside of the apparatus case 3 through the light-transmissive cover plate 1. In the electronic apparatus 100, since heat generated by the CPU 50a and the drivers is quickly released to the outside of the apparatus case body 3, a temperature increase in the apparatus case 3 is suppressed, and operation failures of the CPU 50a and other components are also suppressed. Furthermore, the light-transmissive cover plate 1 made of sapphire has a very high hardness and is not easily damaged or broken.

In the above-described embodiment, the CPU 50a and the drivers (the first driver 54a, the second driver 54b, and the third driver 54c) are described as examples of the information processing devices. However, the information processing devices also include the wireless communication unit 51, which generates heat during communication with an external device and information processing; the image display device 52, which generates heat when, for example, a backlight unit emits light; the piezoelectric vibrating element 55 and the external speaker 56, which generate heat when piezoelectric elements vibrate; the imaging unit 58, which generates heat during image information processing; and the battery 59, which generates heat when a current is output. These devices may also be thermally connected to the light-transmissive cover plate 1 through the thermally conductive portion. Thus, the type of the information processing devices is not particularly limited as long as the information processing devices generate heat. When the information processing devices include the CPU 50a, as in the electronic apparatus 100, the CPU 50a tends to generate a particularly large amount of heat. Therefore, when the CPU 50a is thermally connected to the single crystal body 11, operation failures due to a temperature increase of the CPU 50a can be suppressed.

In the above-described embodiment, a portion of the thermally conductive portion 110 (first thermally conductive body 111) is made of sapphire having a relatively high thermal conductivity and high insulation performance. However, as another embodiment, the first thermally conductive body 111 may be made of, for example, a metal such as Cu. When the first thermally conductive body 111 may be conductive, the thermal conductivity of the thermally conductive portion 110 as a whole can be increased by using the first thermally conductive body 111 made of, for example, a metal such as Cu.

As described above, the light-transmissive cover plate 1 includes the display portion in which an image of the image display surface 52a is displayed and the peripheral edge portion which surrounds the display portion, and the thermally conductive portion 110 is in contact with the peripheral edge portion. Therefore, the thermally conductive portion 110 does not block the image of the image display surface 52a. More specifically, the light shielding layer 7 that blocks the image of the image display surface 52a is provided, and the thermally conductive portion 110 is connected to the light shielding layer 7. The light shielding layer 7 also blocks the thermally conductive portion 110 from the user's sight. When, for example, the light shielding layer 7 is composed of a high-thermal-conductivity light shielding film containing a metal as the main component as described above, the heat dissipation effect of the thermally conductive portion 110 can be sufficiently increased.

Figure 6:
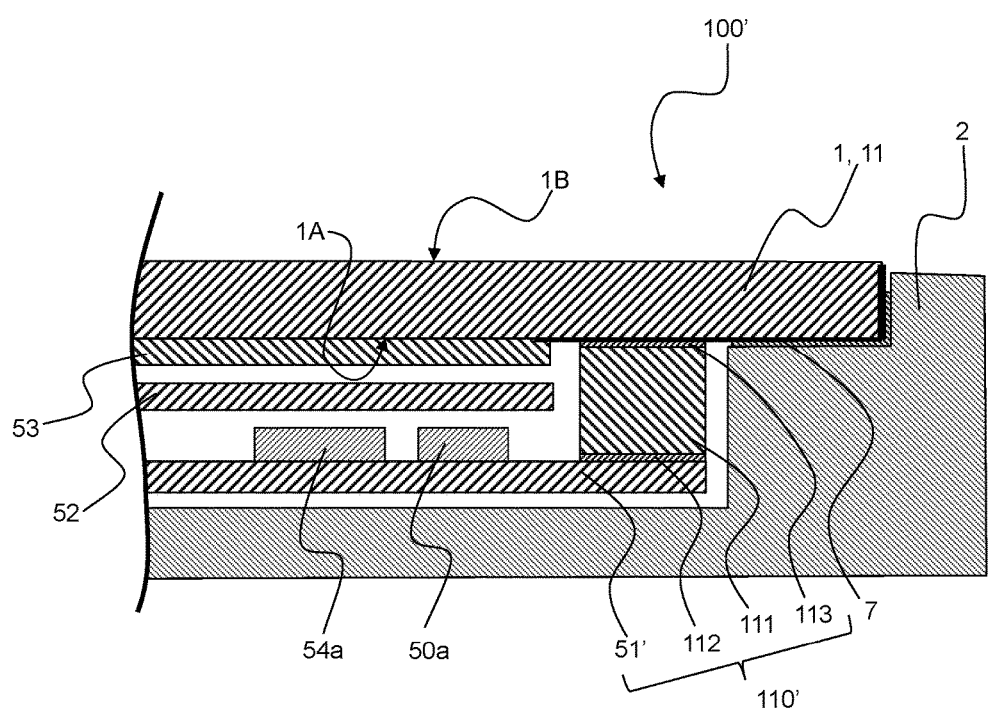
FIG. 6 is an enlarged cross-sectional view illustrating a portion of another embodiment of the electronic apparatus.

FIG. 6 is a cross-sectional view for describing another embodiment of the electronic apparatus (electronic apparatus 100'). In the embodiment illustrated in FIG. 6, components similar to those in the embodiment illustrated in FIG. 4 are denoted by the same reference numerals. In the electronic apparatus 100', a CPU 50a and drivers (only a first driver 54a is illustrated in FIG. 4) are mounted on a surface of an insulating circuit board 51' (hereinafter also referred to simply as a circuit board 51') made of, for example, sapphire. The electronic apparatus 100' includes a thermally conductive portion 110' that thermally connects at least one of information processing devices (the CPU 50a and the first driver 54a in the present embodiment) to the light-transmissive cover member 1. The thermally conductive portion 110' includes a first thermally conductive body 111 made of, for example, a single crystal containing alumina (Al$_2$O$_3$) as the main component (that is, sapphire); an adhesive layer 112 disposed between the first thermally conductive body 111 and the circuit board 51'; a light shielding film 7; and an adhesive layer 113 disposed between the first thermally conductive body 111 and the light-transmissive cover member 1 (more specifically, between the first thermally conductive body 111 and the light shielding film 7). In the present embodiment, the thermally conductive portion 110' further includes the circuit board 51'. Since sapphire has a high insulation performance, metal wires made of silver, copper, or the like, for example, can be formed on a surface thereof. Therefore, sapphire is suitable as an insulating substrate of a circuit board. The circuit board 51' including an insulating substrate made of sapphire also has a relatively high thermal conductivity, and is therefore suitable as a portion of the thermally conductive member 110.

A substrate obtained by forming an insulating film made of a resin or the like on a substrate made of a metal, such as copper, may instead be used as the circuit board. A metal substrate made of copper, for example, also has a relatively high thermal conductivity. Therefore, heat is easily transmitted to the light-transmissive cover plate 1 through the thermally conductive portion 110'. The circuit board may instead be, for example, a resin circuit board obtained by forming an insulating substrate by saturating a glass fiber cloth with epoxy resin and subjecting the cloth to a thermosetting process, and then forming a circuit composed of metal wires on the insulating substrate. Alternatively, the circuit board may be a ceramic circuit board obtained by forming a circuit composed of metal wires on a ceramic substrate. Also when an insulating circuit board is used, preferably, a thermally conductive pattern that serves as a thermal conduction path is formed on the surface of the insulating substrate by using a material having a relatively high thermal conductivity, such as a metal or sapphire, and is thermally connected to the thermally conductive portion 110'. In this case, heat generated by the CPU 50*a* and the drivers is easily transmitted to the thermally conductive portion 110' through the thermally conductive pattern.

As described above, the structure, shape, material, etc., of the thermally conductive member for transmitting heat to the light-transmissive cover plate 1 are not particularly limited. When the thermally conductive portion 110' includes the circuit board 51' on which the information processing devices are disposed as in the present embodiment, the arrangement of the information processing devices and the first thermally conductive body 111 in the case body 3 can be relatively freely designed, and the overall size of the electronic apparatus 100' can be reduced.

In the present embodiment, the casing 2 contains a polycarbonate resin or the like as a main component. The main component of the casing 2 may be any material that is commonly used by a person skilled in the art, and is not particularly limited. For example, a resin material, such as a polycarbonate resin, an ABS resin, or a nylon-based resin, or the same material as the material of the light-transmissive cover plate may be used. The casing 2 may be composed of a single member or be formed by combining a plurality of members.

In the above-described embodiments, the single crystal body 11 of the light-transmissive cover plate 1 is thermally connected to the thermally conductive member 110. However, for example, a portion of the casing 2 may be formed of a single crystal body made of sapphire, and the single crystal body of the casing 2 may be thermally connected to the thermally conductive member 110.

The image display device 52 is a liquid crystal display panel, and has a backlight unit and a liquid crystal layer which are not illustrated in the drawings. Image information displayed on the image display surface 52*a* of the image display device 52 is formed when white light emitted from an LED lamp of the backlight unit passes through the liquid crystal layer of the image display device 52 and is thereby partially colored. More specifically, when the white light emitted from the LED lamp passes through the liquid crystal layer, the wavelength range of the transmitted light is limited for each portion so that the color of the transmitted light is changed. Thus, the image information representing characters, symbols, and drawings having various colors and shapes is formed on the image display surface 52*a*. The light carrying the image information formed on the image display surface 52*a* in this manner is incident on the first principal surface 1A of the light-transmissive cover member 1 and emitted from the second principal surface 1B of the light-transmissive cover member 1. The emitted light reaches the eyes of an operator (user) of the electronic apparatus 100, and the operator recognizes the characters, symbols, drawings, etc. represented by the image information.

The touch panel 53 is, for example, a projection type electrostatic capacitance touch panel and detects an operation of the user on the second principal surface 1B of the light-transmissive cover plate 1. The touch panel 53 is attached to the first principal surface 1A of the light-transmissive cover plate 1 and includes two sheet-shaped electrode sensors that are arranged so as to face each other. The two electrode sensors are bonded together with a transparent adhesive sheet.

A plurality of long and narrow X electrodes that extend in an X-axis direction (for example, the left-right direction of the electronic apparatus 100) and that are arranged in parallel with each other are formed on one of the electrode sensors. A plurality of long and narrow Y electrodes that extend in a Y-axis direction (for example, the top-bottom direction of the electronic apparatus 100) and that are arranged in parallel with each other are formed on the other electrode sensor. When the user's finger touches the second principal surface 1B of the light-transmissive cover plate 1, the electrostatic capacitance between an X electrode and a Y electrode positioned below the touched portion changes. This enables the touch panel 53 to detect the operation on the second principal surface 1B of the light-transmissive cover plate 1. The change in the electrostatic capacitance between the X electrode and the Y electrode, which occurs in the touch panel 53, is transmitted to the control unit 50, and the control unit 50 specifies the details of the operation performed on the second principal surface 1B of the light-transmissive cover plate 1 on the basis of the change in the electrostatic capacitance, and performs an operation accordingly.

The piezoelectric vibrating element 55 is an element for transmitting a reception sound to the user of the electronic apparatus 100. The piezoelectric vibrating element 55 is vibrated by a driving voltage applied from the control unit 50. The control unit 50 generates a driving voltage based on a sound signal indicating the reception sound and applies the driving voltage to the piezoelectric vibrating element 55. The piezoelectric vibrating element 55 is vibrated by the control unit 50 based on the sound signal indicating the reception sound, and thus the reception sound is transmitted to the user of the electronic apparatus 100. In this manner, the control unit 50 functions as a driving unit allowing the piezoelectric vibrating element 55 to vibrate based on the sound signal. The piezoelectric vibrating element 55 will be described in detail below.

The external speaker 56 converts the electric sound signal from the control unit 50 into a sound, and outputs the sound. The sound output from the external speaker 56 is output to the outside through speaker holes 20 formed in a back surface 101 of the electronic apparatus 100.

The microphone 57 converts the sound input from the outside of the electronic apparatus 100 into an electric sound signal, and outputs the electric sound signal to the control unit 50. The sound from the outside of the electronic apparatus 100 enters the electronic apparatus 100 through a microphone hole 21 formed in the back surface 101 of the electronic apparatus 100, and is input to the microphone 57.

The imaging unit 58 includes an imaging lens 58a and an imaging element, and captures a still image and a moving image under the control of the control unit 50.

The battery 59 outputs electric power for the electronic apparatus 100. The electric power output from the battery 59 is supplied to electronic components included in the control unit 50 and the wireless communication unit 51 of the electronic apparatus 100.

<Details of Piezoelectric Vibrating Element>

Figure 7:
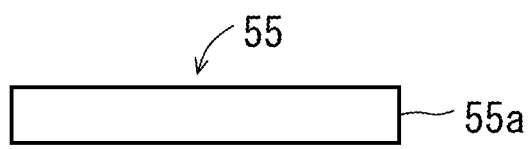
FIG. 7 is a plan view illustrating a piezoelectric vibrating element.
Figure 8:
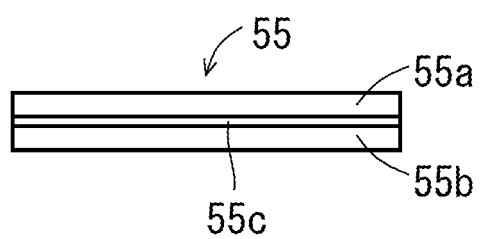
FIG. 8 is a side view illustrating the piezoelectric vibrating element.

FIGS. 7 and 8 are, respectively, a top view and a side view illustrating the structure of the piezoelectric vibrating element 55. As illustrated in FIGS. 7 and 8, the piezoelectric vibrating element 55 has a long shape that extends in one direction. Specifically, the piezoelectric vibrating element 55 has a long and narrow rectangular plate shape in plan view. The piezoelectric vibrating element 55 has, for example, a bimorph structure and includes a first piezoelectric ceramic plate 55a and a second piezoelectric ceramic plate 55b which are attached to each other with a shim material 55c interposed therebetween. The piezoelectric vibrating element 55 may instead be a multilayer piezoelectric vibrating element which does not include the shim material 55c, in which piezoelectric ceramic plates and electrodes are alternately stacked, and in which the piezoelectric ceramic plates at the upper side and the piezoelectric ceramic plates at the lower side in the thickness direction have different polarization directions.

In the piezoelectric vibrating element 55, when a positive voltage is applied to the first piezoelectric ceramic plate 55a and a negative voltage is applied to the second piezoelectric ceramic plate 55b, the first piezoelectric ceramic plate 55a expands in the longitudinal direction and the second piezoelectric ceramic plate 55b contracts in the longitudinal direction. Accordingly, as illustrated in FIG. 9, the piezoelectric vibrating element 55 is bent such that the first piezoelectric ceramic plate 55a is outwardly convex.

In contrast, in the piezoelectric vibrating element 55, when a negative voltage is applied to the first piezoelectric ceramic plate 55a and a positive voltage is applied to the second piezoelectric ceramic plate 55b, the first piezoelectric ceramic plate 55a contracts in the longitudinal direction and the second piezoelectric ceramic plate 55b expands in the longitudinal direction. Accordingly, as illustrated in FIG. 10, the piezoelectric vibrating element 55 is bent such that the second piezoelectric ceramic plate 55b is outwardly convex.

Figure 9:
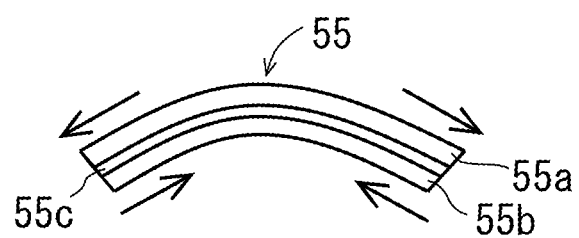
FIG. 9 is a diagram illustrating a state in which the piezoelectric vibrating element is bent.
Figure 10:
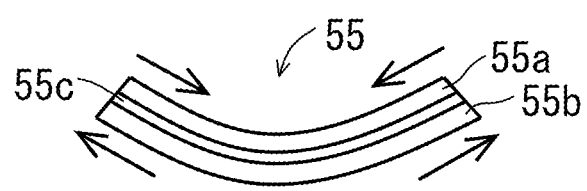
FIG. 10 is a diagram illustrating a state in which the piezoelectric vibrating element is bent.

The piezoelectric vibrating element 55 is alternately set to the state of FIG. 9 and the state of FIG. 10, so that bending vibration of the piezoelectric vibrating element 55 occurs. The control unit 50 causes the bending vibration of the piezoelectric vibrating element 55 by applying an alternating-current voltage, in which a positive voltage and a negative voltage alternately appear, between the first piezoelectric ceramic plate 55a and the second piezoelectric ceramic plate 55b.

The piezoelectric vibrating element 55 illustrated in FIGS. 7 to 10 includes a single structure including the first piezoelectric ceramic plate 55a and the second piezoelectric ceramic plate 55b which are bonded together with the shim material 55c interposed therebetween. However, a plurality of structures similar to this structure may be stacked together.

<Arrangement Position of Piezoelectric Vibrating Element>

Figure 11:
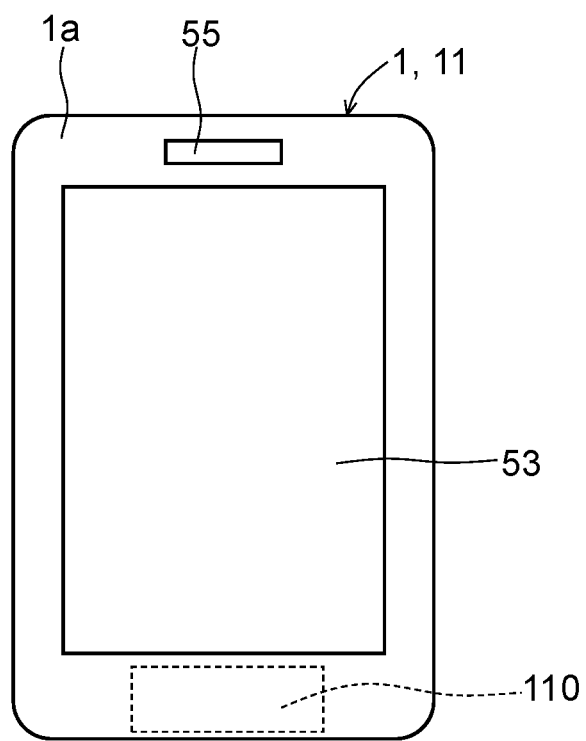
FIG. 11 is a plan view illustrating the light-transmissive cover member.

FIG. 11 is a plan view of the light-transmissive cover plate 1 seen from the first principal surface 1A side. The piezoelectric vibrating element 55 is attached to the first principal surface 1A of the light-transmissive cover plate 1 with an adhesive such as a double-sided tape. The piezoelectric vibrating element 55 is disposed on the first principal surface 1A of the light-transmissive cover member 1 so as not to overlap the image display device 52 and the touch panel 53 in plan view of the light-transmissive cover plate 1 seen from the first principal surface 1A side.

<Regarding Generation of Reception Sound by Vibration of Piezoelectric Vibrating Element>

In the present embodiment, an air conduction sound and a conduction sound are transmitted to the user from the light-transmissive cover plate 1 by vibrating the light-transmissive cover plate 1 with the piezoelectric vibrating element 55. That is, the vibration of the piezoelectric vibrating element 55 is transmitted to the light-transmissive cover plate 1 so that the air conduction sound and the conduction sound are transmitted to the user from the light-transmissive cover plate 1.

Here, the term "air conduction sound" means a sound recognized by a human brain based on vibration of an eardrum caused by a sound wave (air vibration) that enters an external auditory meatus hole (a so-called "ear hole"). The term "conduction sound" is a sound recognized by a human brain based on vibration of the eardrum caused when an auricle is vibrated and the vibration of the auricle is transmitted to the eardrum. Hereinafter, the air conduction sound and the conduction sound will be described in detail.

Figure 12:
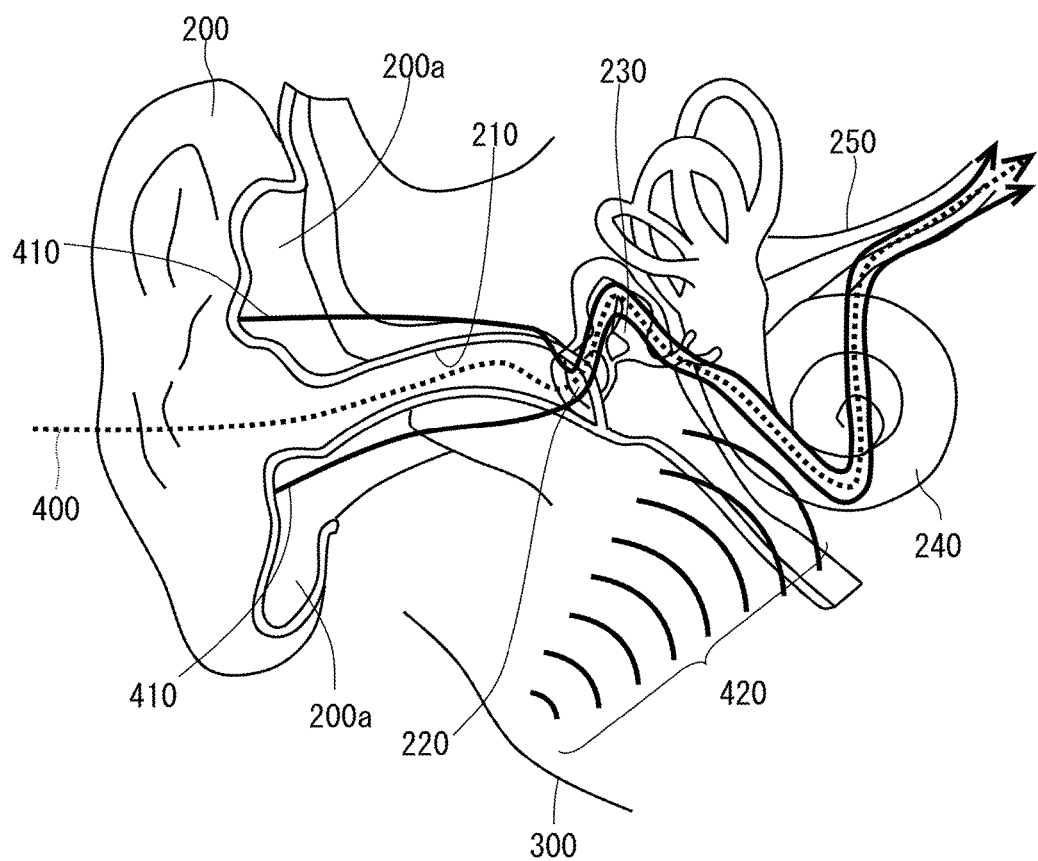
FIG. 12 is a diagram for describing an air conduction sound and a conduction sound.

FIG. 12 is a diagram for describing the air conduction sound and the conduction sound. FIG. 12 illustrates the structure of an ear of a user of the electronic apparatus 100. In FIG. 12, the wavy line 400 indicates the conduction path of a sound signal (sound information) when the air conduction sound is recognized by the brain, and the solid lines 410 indicate the conduction paths of the sound signal when the conduction sound is recognized by the brain.

When the piezoelectric vibrating element 55 attached to the light-transmissive cover plate 1 is vibrated based on the electric sound signal indicating the reception sound, the light-transmissive cover plate 1 vibrates and sound waves are output from the light-transmissive cover plate 1. When the user holds the electronic apparatus 100 with his or her hand and brings the light-transmissive cover plate 1 of the electronic apparatus 100 close to his or her auricle 200 or into contact with his or her auricle 200, the sound waves output from the light-transmissive cover plate 1 enter an external auditory meatus hole 210. The sound waves from the light-transmissive cover plate 1 travel through the external auditory meatus hole 210 and make the eardrum 220 vibrate. The vibration of the eardrum 220 is transmitted to an auditory ossicle 230, so that the auditory ossicle 230 vibrates. The vibration of the auditory ossicle 230 is transmitted to a cochlea 240 and is converted into an electrical signal in the cochlea 240. The electrical signal is transmitted to the brain through an acoustic nerve 250, and the reception sound is recognized by the brain. In this manner, the air conduction sound is transmitted from the light-transmissive cover plate 1 to the user.

When the user holds the electronic apparatus 100 with his or her hand and brings the light-transmissive cover plate 1 of the electronic apparatus 100 into contact with his or her auricle 200, the auricle 200 is vibrated by the light-transmissive cover plate 1, which is vibrated by the piezoelectric vibrating element 55. The vibration of the auricle 200 is transmitted to the eardrum 220, so that the eardrum 220 vibrates. The vibration of the eardrum 220 is transmitted to the auditory ossicle 230, so that the auditory ossicle 230 vibrates. The vibration of the auditory ossicle 230 is transmitted to the cochlea 240 and is converted into an electrical signal in the cochlea 240. The electrical signal is transmitted to the brain through the acoustic nerve 250, and the reception sound is recognized by the brain. In this manner, the conduction sound is transmitted from the light-transmissive cover plate 1 to the user. FIG. 15 illustrates an auricular cartilage 200a in the auricle 200.

The conduction sound herein is different from a so-called "bone conduction sound". The bone conduction sound is a sound recognized by a human brain when the skull is vibrated and the vibration of the skull directly stimulates the inner ear such as the cochlea. In FIG. 15, the plurality of arcs 420 indicate the transmission path of the sound signal when, for example, the jawbone 300 is vibrated and the bone conduction sound is recognized by the brain.

In this manner, in the electronic apparatus 100 according to the present embodiment, the air conduction sound and the conduction sound can be transmitted from the light-transmissive cover plate 1 to the user of the electronic apparatus 100 by appropriately vibrating the light-transmissive cover plate 1 on the front surface with the piezoelectric vibrating element 55. The structure of the piezoelectric vibrating element 55 according to the present embodiment is designed such that the air conduction sound and the conduction sound can be appropriately transmitted to the user. Various advantages are obtained by constituting the electronic apparatus 100 such that the air conduction sound and the conduction sound can be transmitted to the user.

For example, since the user can hear a sound when the user brings the light-transmissive cover plate 1 into contact with his or her ear, the user can talk without being concerned so much about the position of a portion the electronic apparatus 100 that is brought into the ear.

In addition, when there is large ambient noise, the user can increase the volume of the conduction sound and reduce the ambient noise he or she hears by strongly pressing his or her ear against the light-transmissive cover plate 1. Accordingly, the user can easily talk even when there is large ambient noise.

In addition, even when the user is wearing earplugs or earphones, the user recognizes the reception sound from the electronic apparatus 100 when the user brings the light-transmissive cover plate 1 into contact with his or her ear (more specifically, auricle). Furthermore, even when the user is wearing a headphone, the user recognizes the reception sound from the electronic apparatus 100 when the user brings the light-transmissive cover plate 1 into contact with the headphone.

<Regarding Earpiece Holes (Holes for Receiver)>

In an electronic apparatus such as a mobile phone, earpiece holes may be formed on the light-transmissive cover plate 1 on the front surface to allow a sound output from a receiver (receiver speaker) disposed in the electronic apparatus to be emitted to the outside of the electronic apparatus.

In the electronic apparatus 100 according to the present embodiment, since the reception sound is generated by the vibration of the light-transmissive cover plate 1, the reception sound can be appropriately transmitted to the user even when no earpiece holes are formed in the electronic apparatus 100. The light-transmissive cover plate 1 is a single crystal body containing alumina ($Al_2O_3$) as the main component, and is considerably harder than strengthened glass or the like. In addition, the light-transmissive cover plate 1 is highly resistant to various chemicals. When such a single crystal body containing alumina ($Al_2O_3$) as the main component is processed, for example, to form the earpiece holes, an expensive production apparatus such as a laser processing apparatus is necessary, and the process time is long; accordingly, the production cost may be relatively high. Since the light-transmissive cover plate 1 of the present embodiment has no earpiece holes, the cost for processing the holes is not necessary and the production cost of the electronic apparatus 100 is low. Furthermore, since the light-transmissive cover plate 1 has no earpiece holes, the strength of the light-transmissive cover plate 1 is maintained relatively high. Furthermore, in the present embodiment, since there are no earpiece holes in the surface of the electronic apparatus 100, the problem of water or dust or the like entering the electronic apparatus 100 through the earpiece holes does not occur. Therefore, the electronic apparatus 100 does not need to have a waterproof structure or a dustproof structure to avoid this problem, and the cost of the electronic apparatus 100 can be further reduced.

<Arrangement of Thermally Conductive Member>

As illustrated in FIGS. 2 and 11, the thermally conductive member 110 is disposed at a location relatively far from the location where the piezoelectric vibrating element 55 is disposed. The piezoelectric vibrating element 55 is disposed at a portion that is brought close to the operator's ear or face when the operator listens to the reception sound. The location of the thermally conductive member 110 is the location at which the heat generated in the case member 3 is transmitted to the light-transmissive cover plate 1, and the temperature of the portion of the light-transmissive cover plate 1 corresponding to the thermally conductive member 110 relatively easily increases. To prevent the operator from feeling excessively hot, the thermally conductive portion 110 is preferably separated from the portion that is brought close to the operator's ear or face when the operator listens to the reception sound. For example, when the light-transmissive cover plate 1 has a rectangular shape, preferably, the light-transmissive cover plate 1 is divided into two regions in the longitudinal direction of the rectangular shape, and the piezoelectric vibrating element 55 and the thermally conductive member 110 are disposed in different regions.

In the above-described example, the electronic apparatus is a smart phone terminal or a tablet terminal. However, a structure similar to that of the above-described electronic apparatus may be applied to electronic apparatuses other than a smart phone terminal, a tablet terminal, or a mobile phone. For example, the structure may be applied to a game machine, a laptop computer, a portable navigation system, and the like. The invention of the subject application is not limited to the above-described embodiments, and various modifications and changes may be made within the scope of the present invention.

REFERENCE SIGNS LIST 1 light-transmissive cover plate
1A first principal surface 1B second principal surface
50 control unit
52 image display device
52a image display surface
53 touch panel
55 piezoelectric vibrating element
100 electronic apparatus

The invention claimed is:

1. An electronic apparatus comprising:
a case body including a light-transmissive cover plate;
a circuit board including a peripheral portion;
a plurality of information processing devices in the case body, at least one of the information processing devices located on the peripheral portion of the circuit board;
an image display device in the case body, the image display device including an image display surface; and
a thermally conductive portion in the case body,
wherein
the light-transmissive cover plate is a single crystal plate containing alumina ($Al_2O_3$) as a main component,
the light-transmissive cover plate includes
a first principal surface that faces the image display surface and a second principal surface opposite to the first principal surface,
the light-transmissive cover plate further includes:
a display portion on which an image of the image display surface is displayed; and
a peripheral edge portion that surrounds the display portion,
the thermally conductive portion is connected to at least a part of the peripheral edge portion,
the thermally conductive portion is not connected to the display portion, and
the thermally conductive portion is located between and directly connects the at least one of the information processing devices located on the peripheral portion of the circuit board and the peripheral portion of the light-transmissive cover plate.

2. The electronic apparatus according to claim 1, further comprising a light shielding layer provided on the light-transmissive cover plate in the peripheral edge, wherein the light shielding layer blocks the image of the image display surface, and the thermally conductive portion is connected to the light shielding layer.

3. The electronic apparatus according to claim 1, wherein the thermally conductive portion includes a high-thermal-conductivity body containing a single crystal of alumina ($Al_2O_3$) as the main component.

4. The electronic apparatus according to claim 1, wherein the information processing devices include a central processing unit (CPU), and the CPU is thermally connected to the light-transmissive cover plate.

5. The electronic apparatus according to claim 1, further comprising a piezoelectric vibrating element disposed on the light-transmissive cover plate.

6. The electronic apparatus according to claim 5, wherein the piezoelectric vibrating element vibrates when a driving voltage based on a sound signal is applied thereto.

7. The electronic apparatus according to claim 5, wherein the piezoelectric vibrating element has a long and narrow rectangular plate shape in a plan view.

8. The electronic apparatus according to claim 5, wherein the piezoelectric vibrating element is disposed so as not to overlap the image display device.

9. An electronic apparatus comprising:
a case body comprising a cover plate, the cover plate consisting of a single crystal plate and being light transmissive;
a circuit board including a peripheral portion;
at least one processor disposed in the case body;
an image display device disposed in the case body, and comprising an image display surface; and
a thermally conductive member comprising:
a first member disposed in the case body;
a second member disposed in the case body, and connected to the first member;
wherein the cover plate includes a surface, the surface including:
a first region that faces the image display surface, and that is connected neither to the first member nor the second member and
a second region that surrounds the first region, that does not face the image display surface, and that is connected to the first member while the second member is connected to the at least one processor, and
the thermally conductive portion is located between and directly connects the at least one processor located on the peripheral portion of the circuit board and the peripheral portion of the light-transmissive cover plate,
wherein the thermally conductive portion includes a high-thermal-conductivity body containing a single crystal of alumina ($Al_2O_3$) as the main component.

10. The electronic apparatus according to claim 9, wherein the second member is a substrate comprising the at least one processor on the substrate.

* * * * *